Figure 1:
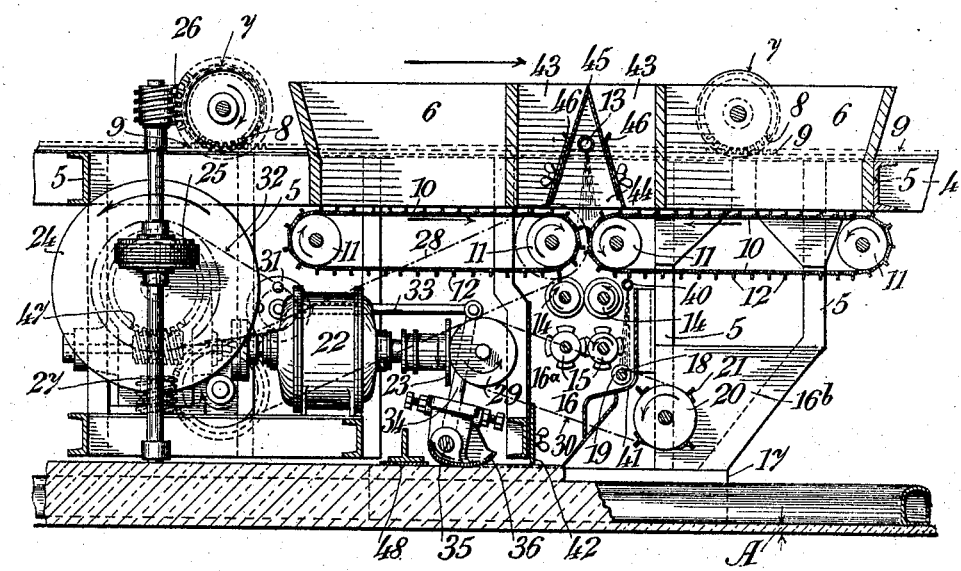

No. 806,371. PATENTED DEC. 5, 1905.
H. SIEGWART.
MACHINE FOR MANUFACTURING HOLLOW ARTIFICIAL STONE BEAMS
OR GIRDERS.
APPLICATION FILED MAY 20, 1905.

2 SHEETS—SHEET 1.

Witnesses:
H. L. Amer
P. V. Sommers

Inventor:
Hans Siegwart,
by Henry Orth
atty.

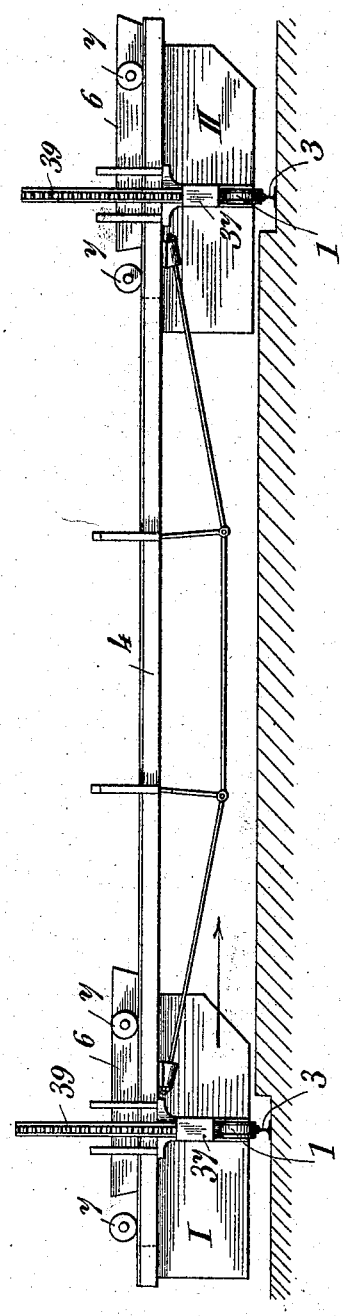

UNITED STATES PATENT OFFICE.

HANS SIEGWART, OF LUCERNE, SWITZERLAND.

MACHINE FOR MANUFACTURING HOLLOW ARTIFICIAL-STONE BEAMS OR GIRDERS.

No. 806,371.      Specification of Letters Patent.      Patented Dec. 5, 1905.

Application filed May 20, 1905. Serial No. 261,467.

*To all whom it may concern:*

Be it known that I, HANS SIEGWART, a citizen of the Republic of Switzerland, residing at Lucerne, Switzerland, have invented new and useful Improvements in or Relating to Machines for Manufacturing Hollow Artificial-Stone Beams or Girders, of which the following is a specification.

This invention relates to a machine for manufacturing hollow artificial-stone beams or girders by forming a plate longitudinally traversed by removable cores, the said plate being finally divided into separate hollow girders. The machine comprises a vertically-adjustable truck or carriage which is arranged on a frame adapted to travel normally to the direction of the movement of the carriage or truck, an apparatus for preparing the mortar or cement from which the structures are made and delivering it downward, a stripping-off or cleaning-edge plate below the apparatus, and a rocking press-bar following the said cleaning edge for the purpose of enabling during the advance of the carriage or truck a layer of cement to be deposited and compressed in such manner that a slab or plate constituting the bottom portions of a number of connected hollow girders can be produced during the first advance of the carriage when it is in the lowered position, while during the second advance of the carriage, which has meantime been raised after the cores have been placed on the bottom plate for the purpose of forming the hollows of the girders, a second layer of cement is deposited and compressed, so as to form the solid portions or cross-stays or side walls of the girders and their covers or upper portions. To the under side of the carriage are secured plates which during the advance of the carriage and the depositing of the upper layer of cement are pulled through the cement mass between each two girders to be produced for the purpose of forming the side walls of the girders. The apparatus for preparing and delivering cement is divided into a front and rear compartment, the front compartment containing a throwing device which violently throws cement into the narrow spaces between the cores intended for forming cross-stays of the girders. The apparatus is provided with two outside hoppers or receptacles intended to receive sand and two inside hoppers intended to receive cement, the bottoms of the said hoppers being constituted by endless transport or conveyer bands, which in their movement toward each other under the hoppers, each take up a thin layer of sand, and on the top of it, a thin layer of cement, for the purpose of obtaining by this arrangement a good distribution of the materials, so that the usual long time for mixing is not necessary. Under the apparatus for supplying the cement materials and delivering them downward are arranged mixing-rolls and under the latter mixing and distributing rolls.

A construction of the machine according to this invention is illustrated, by way of example, in the accompanying drawings, in which—

Figure 2:
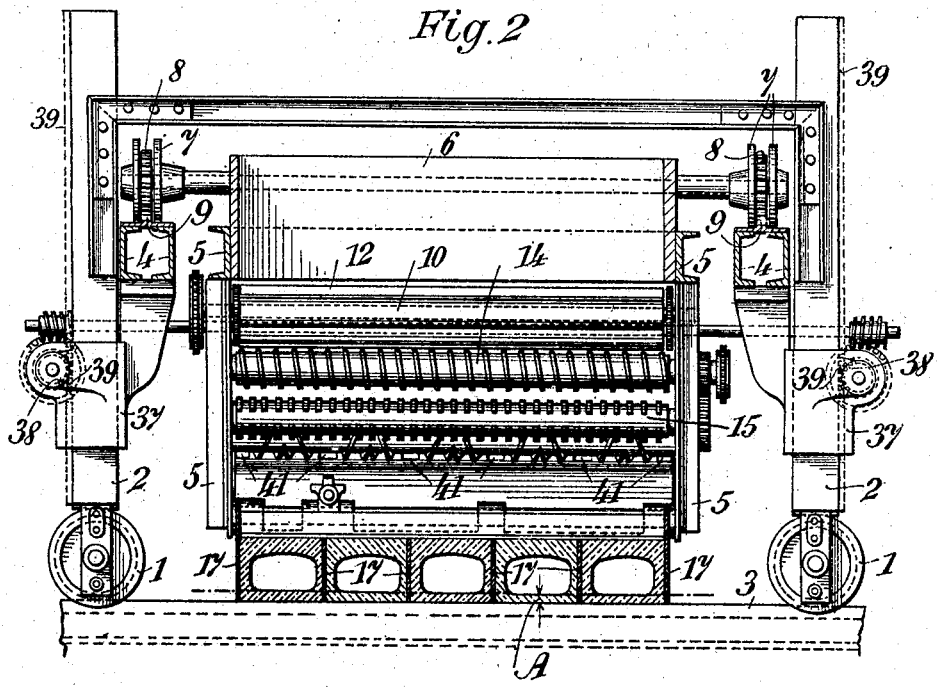

Figure 1 is a partial longitudinal section; Fig. 2, a cross-section, and Fig. 3 a diagrammatic view.

The machine illustrated comprises a traveling frame traveling on rails 3 by means of disks or wheels 1, supported in brackets 2. The traveling frame is provided with horizontal girders 4, constituted by bars of U shape in cross-section supported by the brackets 2, the said girders 4 being parallel to each other and at right angles to the rails 3. Between these girders is placed a carriage provided with wheels 7, running on the girders 4, the said carriage comprising a frame made of bars 5 and two sand-supply hoppers 6 and two cement-supply hoppers 43. These hoppers are arranged one behind another in the direction of the movement of the carriage in such manner that the hoppers 6 are outside and the hoppers 43 between them. Of the running-wheels, which are mounted on axles passing transversely through the carriage, the wheels at the rear of the carriage are provided for the driving of the carriage with toothed wheels 8, engaging toothed racks 9, secured to the girders 4.

10 represents endless horizontally-guided carriers or conveyer-bands, each of which closes the bottom of one hopper 6 and the hopper 43 next to it and is guided over two rollers 11, supported in the carriage-frame and arranged transversely of the girders 4 or of the carriage. The bands are provided with cross-bars 12. Of the rollers 11, which are all situated in a horizontal plane arranged under the hoppers, the two central ones are arranged in juxtaposition below an intermediate space 44 between the inner hoppers 43, in which space there is a horizontal water-supply pipe provided with downwardly-directed perforations, through which fine water-jets can be made to play between the rollers under the said pipe. The lateral walls 45, limiting the intermediate space 44, are provided with adjustable plates 46, the bottom edges of which can be adjustable more or less near the transport-bands, so that the distances between the upper edges of the cross-bars 12, moving under the plates 46, and the bottom edges of these plates can be altered as desired. Under the two central rollers and parallel to them there are supported in the carriage-frame two adjoining screw-rolls 14 and under the latter and parallel to them two adjoining cam-rollers 15. The rollers 14 and 15 are arranged above the cement-chute 16, running transversely of the carriage-frame, the said chute being open at the bottom.

17 represents plates arranged parallel to each other on the under side of the carriage-frame and detachably secured to the latter and having the distance between them equal to the width of the artificial-stone girder to be produced and are constituted by bars placed edgewise. In the mixing-compartment under the front cam-roller there is supported in the carriage-frame a screw-spindle 18, parallel to the said roller and provided with screw-threads or projections.

40 is a second water-supply pipe arranged above the spindle 18 and from which water-jets can be supplied to the screw-threads. The chute 16 is further provided or communicates with a front compartment $16^b$. In that compartment there is a rotatable drum 20, the spindle of which is parallel to the carriage-axles and is also supported in the carriage-frame. This drum is provided on the circumference with longitudinal bars 21.

41 represents openings made in the front wall of the hopper 16 between the spindle 18 and the drum 20.

22 is an electric motor supported on the carriage-frame, the spindle of which carries at one end a friction-disk and at the other end a worm engaging a worm-wheel 47, on the spindle of which are mounted two friction-disks. (These disks are arranged one behind another, so that on the drawings only one is visible.) One of these disks serves to drive a friction-roller 25, supported on the carriage-frame, the spindle of which roller can drive, by means of a worm-gear 26, the axle supporting the rear wheels of the carriage. The other disk serves for driving a second friction-roller, from the spindle of which one of the central rollers 11 can be driven by means of a worm-gear 27 and a chain 28 for the purpose of operating the transport-bands, the rollers of which are geared together. From the friction-disk 23 the drum 20 is driven by means of a friction-roller 29 and transmission means 30.

31 is a crank-disk supported on the carriage-frame and driven from the spindle of the friction-rollers 24 by means of a chain 32. To the crank-pin of the said disk is connected the end of a rod 33, the other end of which is connected to an arm 34, mounted on a spindle 35, supported in the carriage-frame and having secured to it a press-plate or rammer 36, extending transversely across the machine under the carriage and provided with upwardly-curved longitudinal edges. The driving of the rollers 14 15 may be effected by means of toothed wheels from one of the central rollers 11. The girders 4 are not supported by the brackets 2 directly, but by sliding brackets 37, guided on them, the said sliding brackets being provided with toothed wheels which can be rotated by worms and which engage with toothed racks 39 on the brackets 2, whereby, according to the turning of the toothed wheels, the carriage can be raised or lowered.

42 is a stripping-off or leveling bar in front of the press-bar 36 transversely of the carriage and adjustably mounted on the latter, and 48 is a smoothing-bar arranged behind it on the carriage.

The two outer filling-hoppers 6 are filled with sand and the two inner ones 43 with cement. By means of the transport-bands or endless carriers 10, provided at equal distances with transverse bars, these bands when moving in the direction indicated by the arrows take sand from the hoppers 6, the depth of the layer taken corresponding to the thickness of the bars, and carry the said sand forward. The sand is thus continuously brought in layers of uniform thickness under the hoppers 43, where a thin layer of cement is carried away on the sand layers passing underneath. The thickness of this layer of cement depends on the position of the bottom edges of the plates 46 relatively to the transverse bars 12, moving under them a greater distance between the bottom edges of 46 and the upper edges of 12, corresponding to a thicker and a smaller distance to a thinner layer of cement. By suitably adjusting this distance the proportion of sand and cement in the mixture can be regulated. From the hoppers 43 the bands 10 carry the layers of sand provided with layers of cement under the pipe 13 for the purpose of moistening the layers by means of the jets of water escaping from said pipe, and then the cement thus produced is carried between the central rollers 11, whence the cement falls to the mixing-rollers 14. These mixing-rollers draw the cement between themselves and mix it and discharge it on the cam-rollers 15, which divide the cement into two portions.

With the cement-making apparatus just described, owing to sand and cement being placed on each other in thin layers, the raw materials are properly distributed from the very beginning, so that subsequent long mixing is unnecessary. The use of bands for transporting the raw materials enables the material to be supplied uniformly throughout the whole width of the machine.

The working of the machine described for manufacturing artificial-stone girders is as follows: The carriage is set, by means of the parts 38 and 39, in such manner that the press-bar 36 is on the level of the layer A, Figs. 1 and 2. Then the carriage is moved by the electromotor being started from one end (position I, Fig. 1) to the other end (position II) of the girder to be produced, with the throwing-drum 20 thrown out of gear and the openings 41 of the front compartment 16$^b$ of the cement-chute closed. The cement produced in the manner described after being thrown outward by the cam-rollers 15 and again combined below the said rollers in the compartment 16$^a$ falls through the chute to the bottom and is leveled flat by the edge 42, while the bar 36 by its oscillating movement forces down and compresses the flat layer of cement. Any undulations of the surface of the cement layer caused by the bar 36 are smoothed by the fixed smoothing-bar 48, arranged behind the bar 36. In the manner just described the layer or plate A is produced which forms the bottom of the girders to be produced. The carriage is then brought back again to the position I, the mechanism driving the transport-bands being thrown out of gear and the water-pipe 13 shut off. The machine is then set, by means of the parts 38 and 39, in such manner that the press-bar 36 is raised to a height equal to the top of the artificial-stone girder to be produced. The return of the carriage is also effected by means of the motor and the gearing between it and the toothed wheels 8, the friction-roller 25 being, however, shifted on its spindle in such manner that it comes to lie under the pivot-point of the friction-disk 24. After the carriage has again reached the position I the cores which serve to form the hollows in the girders to be produced are placed on the layer A at suitable points and the cutter-plates 17 secured to the bottom of the carriage. Then the friction-roller 25 is moved back again to its original position, the driving-gear for the transport-bands thrown in again, and water-supply turned onto the pipes 13 and 40, and the throwing-drum thrown into gear. The openings 41 of the front compartment 16$^b$ are also uncovered. The carriage moves then again from the position I to the position II, the cement being prepared at the same time in the manner already described. Of the portions of the mass of cement separated by the cam-rollers 15 one portion is projected over the front cam-roller and falls on the screw-threads of the spindle 18, which by means of the said threads supplies the cement to the openings 41 of the front compartment 16$^b$. This cement is again moistened by the water-jets escaping from the pipe 40 and passes through the openings 41 into the front compartment 16$^b$ of the cement-chute and within reach of the throwing-bars 21, mounted on the throwing-drum 20. The openings 41 are directly above the narrow spaces between the plates 17 and the cores, which when filled with cement form the lateral walls of the girders. The driving of the throwing-drum is arranged in such manner that its speed is very high, so that the bars 21 project the cement discharged from the openings 41 into the narrow spaces aforesaid. The additional moistening of the cement by means of the pipe 40, above referred to, has for its object to enable it better to penetrate into the narrow spaces under the rounded-off edges of the cores. The other portion of the cement mass divided by the cam-rollers passes over the rear roller and falls then directly on the cores. As the carriage advances in the direction indicated by the arrow the cement thrown by the drum 20 first penetrates into the narrow spaces before the cement coming from the rear roller falls on the cores for the purpose of forming the tops or covers of the girders. By means of the leveling or cleaning edge 42 the cement is given a flat surface, while the rocking press-bar 36 compresses the leveled material and the undulations caused by the bar 36 are leveled by the smoothing-bar 48. The plates 17 move together with the carriage and form when cement is introduced into the spaces between the cores and the said plates a traveling partition or cutter, so that girders separated from each other are produced.

When one layer of girders is ready, the carriage is raised by the parts 38 and 39, and the surface of the finished layer of girders after having been covered with a layer of sand can be utilized as the support for another layer of girders, which is prepared in the same way. This operation is repeated until the carriage can be no further raised by the parts 38 and 39 for the purpose of forming a new layer, whereupon the carriage is transported by its traveling frame to another place.

Having now particularly described and ascertained the nature of my said invention and in what manner the same is to be performed, I declare that what I claim is—

1. In a machine for making articles of cement, a movable carrier provided with means for depositing a plastic cement, and with means to cut the deposit into separate sections as the carrier is moving along.

2. In a machine for making articles of cement, a movable carrier provided with means for depositing a plastic cement, with means for leveling the deposited cement, with means for compacting the same, with means for smoothing the leveled and compacted deposit and with means for sectioning the same as the carrier is moving along.

3. In a machine for making articles of cement, a movable carrier provided with means for depositing a plastic cement, with means for leveling the deposited cement, with means for compacting the same, with means for smoothing the leveled and compacted deposit and with means for sectioning the same as the carrier is moving along; in combination with means for adjusting the carrier relatively to the surface on which the deposit is made whereby superposed deposits can be formed, leveled, compacted, smoothed and sectioned by interposing sand or the like between each two deposits.

4. A machine for making articles of cement comprising a movable carrier provided with means for depositing a plastic cement on a suitable support and with a rocking rammer for compacting the deposited cement as the carrier is moving along.

5. A machine for making articles of cement, comprising a movable carrier provided with means for depositing a plastic cement on a suitable support and with a rocking rammer of substantially segmental form in cross-section, for compacting the deposited cement as the carrier is moving along.

6. Machine for making articles of cement, comprising a track, a carriage adapted to travel along said track, said carriage provided with means for depositing a plastic cement upon a suitable support, with means for leveling the cement so deposited, with means for compacting the leveled deposit of cement with means for smoothing the leveled and compacted deposit, and with means for sectioning the same as the carriage moves along its track.

7. Machine for making articles of cement, comprising a track, a carriage adapted to travel along said track, said carriage provided with means for depositing a plastic cement upon a suitable support as said carriage travels along its track; in combination with means for adjusting the carriage vertically relatively to the support on which the cement is deposited.

8. Machine for making articles of cement, comprising a track, a carriage adapted to travel along said track, said carriage provided with means for compounding a plastic cement as it travels along its track, comprising sand and cement receptacles open at bottom, mixing-rolls, and a carrier movable under said receptacles and feeding the sand and cement to said mixing-rolls, means to supply water to the sand and cement, and means to deposit the cement on a suitable support.

9. Machine for making articles of cement, comprising a track, a carriage adapted to travel along said track, said carriage provided with means for depositing a plastic cement on a suitable support, with means for leveling the deposit of cement, with means for compacting the leveled deposit and with means for smoothing the leveled and compacted deposit; in combination with means for adjusting the carriage vertically relatively to the support on which the cement is deposited.

10. Machine for making articles of cement, comprising a track, a carriage adapted to travel along said track, said carriage provided with means for depositing a plastic cement on a suitable support, with means for leveling the deposit of cement, with means for compacting the leveled deposit, with means for smoothing the same and with means for sectioning the leveled compacted and smoothed deposit as the carriage travels along its track; in combination with means for adjusting the carriage vertically relatively to the support on which the cement is deposited.

11. Machine for making articles of cement, comprising a wheeled truck provided with a track parallel to the axles of its wheels, a carriage adapted to travel along said track, said carriage provided with means for depositing a plastic cement on a suitable support as it travels along its track, and means for adjusting the carriage vertically relatively to said support.

12. Machine for making articles of cement, comprising a wheeled truck provided with a track, a carriage adapted to travel along said track, said carriage provided with means for depositing a plastic cement on a suitable support as it travels along said track and means for adjusting the carriage vertically relatively to the support on which the cement is deposited.

13. Machine for making articles of cement, comprising a wheeled truck provided with a track parallel to the axis of its wheels, a carriage adapted to travel along said track, said carriage provided with means for forming a plastic cement and depositing the same on a suitable support as the carriage travels along its track; in combination with means for adjusting the carriage vertically relatively to the support on which the cement is deposited.

14. Machine for making articles of cement, comprising a wheeled truck provided with a track parallel to the axis of its wheels, a carriage adapted to travel along said track, said carriage provided with means for forming a plastic cement and depositing the same on a suitable support as the carriage travels along its track, and with means operating successively to level and compact the deposit and then smooth the surface thereof; in combination with means for adjusting the carriage vertically relatively to the support on which the cement is deposited.

15. Machine for making articles of cement, comprising a wheeled truck provided with a track parallel to the axis of its wheels, a carriage adapted to travel along said track, said carriage provided with means for forming a plastic cement and depositing the same on a suitable support as the carriage travels along its track, and with means operating successively to level and compact the deposit and smooth the surface thereof and then section the deposit; in combination with means for adjusting the carriage vertically relatively to the support on which the cement is deposited.

16. Machine for making articles of cement, comprising a track, a carriage adapted to travel along said track, said carriage provided with two sand-receptacles and two cement-receptacles between said sand-receptacles, all the receptacles open at bottom; in combination with two endless carriers adapted to travel toward each other below the sand and cement receptacles and discharge the sand and cement deposited thereon at a point intermediate the cement-receptacles, means to supply water to the layers of sand and cement as they leave the carriers, mixing devices below said point of discharge, a discharge-chute below the mixing devices, mechanism to move the carriage to and fro along its track and mechanism to operate the endless carriers and mixing devices.

17. Machine for making articles of cement, comprising a track, a carriage adapted to travel along said track, said carriage provided with two sand-receptacles and two cement-receptacles open at bottom; in combination with two endless carriers adapted to travel toward each other below the sand and cement receptacles, and discharge the sand and cement deposited thereon at a point intermediate the cement-receptacles, means for determining the amount of sand and cement deposited on the carriers, means to supply water to the layers of sand and cement as they leave the carriers, mixing devices below the point of discharge of the sand and cement, a discharge-chute below said mixing devices, mechanism to move the carriage to and fro along its track and mechanism to operate the endless carriers and mixing devices.

18. Machine for making articles of cement, comprising a track, a carriage adapted to travel along said track, said carriage provided with two sand-receptacles and two cement-receptacles open at bottom; in combination with two endless carriers adapted to travel toward each other below the sand and cement receptacles, and discharge the sand and cement deposited thereon at a point intermediate the cement-receptacles, means for determining the amount of sand and cement deposited on the carriers, means to supply water to the layers of sand and cement as they leave the carriers, mixing devices below the point of discharge of the sand and cement, a discharge-chute below the mixing devices, mechanism on the carriage to move the same to and fro on its track and to operate the endless carriers and mixing devices, comprising a motor and suitable power-transmitting devices.

19. Machine for making articles of cement, comprising a track, a carriage adapted to travel along said track, said carriage provided with two sand-receptacles and two cement-receptacles open at bottom; in combination with two endless carriers adapted to travel toward each other below the sand and cement receptacles, and discharge the sand and cement deposited thereon at a point intermediate the cement-receptacles, means for determining the amount of sand and cement deposited on the carriers, means to supply water to the layers of sand and cement as they leave the carriers, mixing devices below the point of discharge of the sand and cement, a discharge-chute below said mixing devices, means for adjusting the carriage vertically relatively to the surface on which the cement is deposited, mechanism to move the carriage to and fro along its track and mechanism to operate the endless carriers and mixing devices.

20. Machine for making articles of cement, comprising a track, a suitable support therefor, a carriage adapted to travel along said track, said carriage provided with means for depositing a plastic cement on a suitable support as it travels along its track; in combination with means for raising and lowering said track.

21. Machine for making articles of cement, comprising a track, a carriage adapted to travel along said track, said carriage provided with mixing devices, and with means for feeding materials for forming a plastic cement to said mixing devices, and a discharge-chute below the mixing devices, said chute having openings in its front wall below the mixing devices, and a deflecting device to deflect cement coming from the mixing device into and through said openings; in combination with a second discharge-chute in front of the first-named chute and means in said second discharge-chute to take up the cement coming through the aforesaid openings and discharge the same in advance of the cement discharged from the first-named chute.

22. Machine for making articles of cement, comprising a track, means for raising and lowering the track, a carriage adapted to travel along said track, said carriage provided with mixing devices and with means for feeding materials for forming a plastic cement to said mixing devices, and a discharge-chute below the mixing devices, said chute having openings in its front wall below the mixing devices, and a deflecting device to deflect cement coming from the mixing device into and through said openings; in combination with a second discharge-chute in front of the first-named chute and means in said second discharge-chute to take up the cement coming through the aforesaid openings and discharge the same in advance of the cement discharged from the first-named chute.

23. Machine for making articles of cement comprising a track, a carriage adapted to travel along said track, said carriage provided with mixing devices, with means for feeding materials for forming a plastic cement to said mixing devices and a discharge-chute below the mixing devices, said chute having closable openings in its front wall below the mixing devices, a deflecting device for deflecting cement coming from the mixing devices into and through said openings; in combination with a second discharge-chute in front of the first-named chute, and means in said second chute to take up the cement coming through the aforesaid openings and discharge the same in advance of the cement discharged from the first-named chute.

24. Machine for making articles of cement, comprising a track, a carriage adapted to travel along said track, said carriage provided with a discharge-chute extending substantially from one side to the other of the carriage, with means for feeding a plastic cement to said chute, with means operating successively for leveling, compacting and smoothing the layer or bed of cement formed as the carriage travels along its track; in combination with parallel cutter-bars extending substantially from end to end of and detachably secured to the carriage at various points for sectioning said bed of cement.

25. Machine for making articles of cement, comprising a track, means for raising and lowering the same, a carriage adapted to travel along said track, said carriage provided with means for compounding a plastic cement, with a discharge-chute extending substantially from side to side of the carriage to form a bed of cement as said carriage travels along its track; in combination with a leveling-bar secured to the carriage in rear of said chute, a rocking rammer in rear of the leveling-bar, a smoothing-bar in rear of the rammer, said leveling-bar, rammer and smoothing-bar extending likewise from one side of the carriage to the other, and parallel cutter-bars detachably secured to the carriage at points equidistant from one another and extending substantially from end to end of the carriage, for the purposes set forth.

26. Machine for making articles of cement, comprising a wheeled truck provided with a track parallel to the wheel-axles of said truck, means for raising and lowering the track, a carriage adapted to travel along said track, said carriage provided with means for compounding a plastic cement, and with a discharge-chute extending substantially from side to side of the carriage to form a bed of cement as said carriage travels along its track; in combination with a leveling-bar secured to the carriage in rear of said chute, a rocking rammer in rear of the leveling-bar, a smoothing-bar in rear of the rammer, said leveling-bar, rammer and smoothing-bar extending likewise from one side of the carriage to the other, and parallel cutter-bars detachably secured to the carriage at points equidistant from one another and extending substantially from end to end of the carriage, for the purposes set forth.

27. Machine for forming hollow cement girders or beams, comprising a track, means for raising and lowering the same, a carriage adapted to travel along said track, said carriage provided with means for forming a plastic cement and depositing the same in the form of a flat bed or sheet on a suitable support, with means for depositing cement between suitable parallel molds placed on said bed or sheet to form dividing-walls, and to simultaneously form by the first-named means a top sheet or bed of cement to cover the molds and unite the dividing-walls.

28. Machine for forming hollow cement girders or beams, comprising a track, means for raising and lowering the same, a carriage adapted to travel along said track, said carriage provided with means for forming a plastic cement and depositing the same in the form of a flat bed or sheet on a suitable support, with means for depositing cement between suitable parallel molds placed on said bed or sheet to form dividing-walls, and to simultaneously form by the first-named means a top sheet or bed of cement to cover the molds and unite the dividing-walls; in combination with means for leveling, compacting and smoothing the layers of cement deposited and with means for sectioning the finished bed on lines equidistant from the sides of adjacent molds.

29. A machine for making articles of cement, comprising a movable carrier, sand and cement receptacles open at bottom, mixing mechanism, feeding devices adapted to first receive sand and then cement in superposed layers and discharge the same at a point above the mixing mechanism, and means to supply water to the sand and cement at the point of discharge.

In testimony whereof I have signed my name to this specification in the presence of two subscribing witnesses.

HANS SIEGWART.

Witnesses:
A. LIEBERKNECHT,
E. BLUM.